Figure 1:
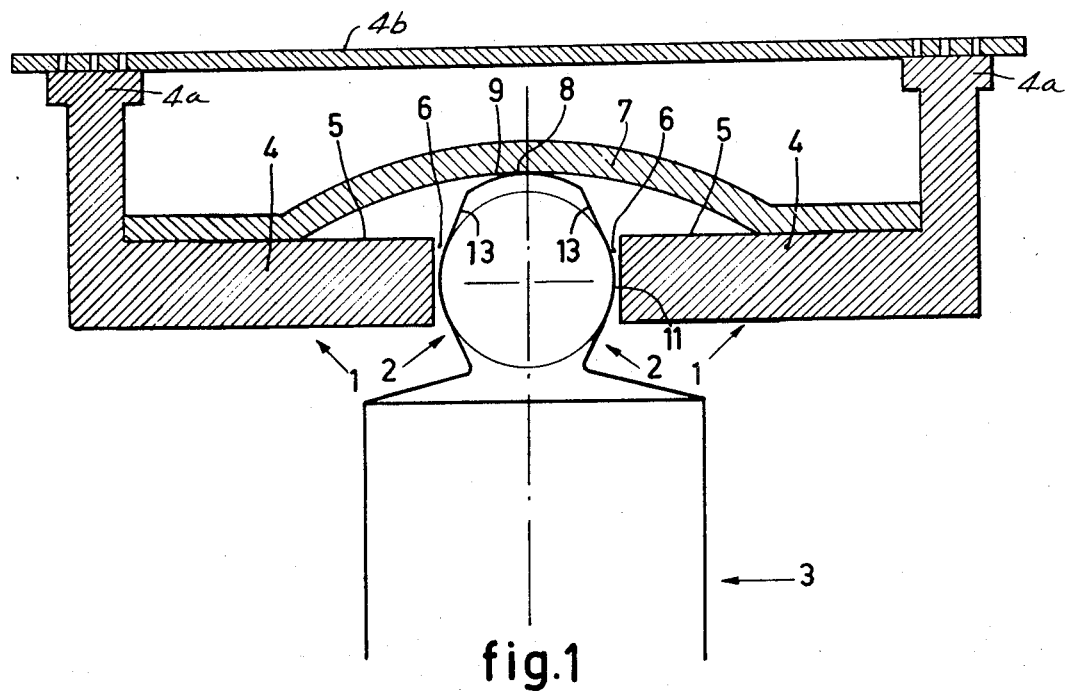

United States Patent [19]
Kuiken et al.

[11] 3,748,731
[45] July 31, 1973

[54] COUPLING FOR SHAVER DRIVE SHAFT AND CUTTER

[75] Inventors: Hendrik Kuiken; Wytse Bergsma, both of Drachten, Netherlands

[73] Assignee: U.S. Philips Corporation, New York, N.Y.

[22] Filed: Aug. 30, 1971

[21] Appl. No.: 176,285

Related U.S. Application Data

[63] Continuation of Ser. No. 842,104, July 16, 1969, abandoned.

[52] U.S. Cl. ............................................... 30/43.6
[51] Int. Cl. ............................................. B67b 7/38
[58] Field of Search ...................... 30/32, 43.4–43.6

[56] References Cited
UNITED STATES PATENTS
3,399,453   9/1968   Biesma.............................. 30/43.6

*Primary Examiner*—Othell M. Simpson
*Attorney*—Frank R. Trifari

[57] ABSTRACT

A dry-shaver having a movable connection between the driving shaft and the cutting member, wherein the free end of the shaft is shaped as a coupling pin and provided with convexly curved lateral surfaces that fit bearingly in a prismatic aperture provided in a portion of the cutting member.

10 Claims, 5 Drawing Figures

INVENTORS
HENDRIK KUIKEN
WYTSE BERGSMA

BY

AGENT 3,748,731

COUPLING FOR SHAVER DRIVE SHAFT AND CUTTER

This application is a continuation of Ser. No. 842,104 filed July 16, 1969, now abandoned.

This invention relates to a dry-shaver having at least one shaving head which is actuated by a driving shaft; in the shaving head is a shear plate assembly capable of assuming an inclined position relative to the driving shaft with a cooperating rotatable cutting member held in engagement with the shear plate; holder portion of the cutting member carries cutters and an aperture in the cutting member is movably connected with a free end of the driving shaft shaped in the form of a coupling pin.

In one known movable connection between a driving shaft and a cutting member, there is the disadvantage during the operation of the dry-shaver, that the cutting member is not always in complete engagement with the associated shear plate, with the result that during the operation a rocking movement of the cutting member relative to the shear plate is produced preventing all the hairs protruding through the shear plate from being cut. The above rocking movement, which is experienced by the user as a vibration of the shear plate, is also responsible for uneven wear of the shear plate relative to the cutting member, so that the existing situation of inaccurate engagement of the cutting member and the shear plate is aggravated.

It is an object of the invention to eliminate these disadvantages as far as possible, and the invention is characterized in that the above-mentioned movable connection is established with the coupling pin, formed at its sides or lateral faces with convex curved surfaces that fit bearingly into the prismatic aperture in the cutter-carrying holder of the cutting member.

Thus, a very simple movable connection is obtained between the driving shaft and the cutting member, which connection permits an inclined position of the cutting member relative to the driving shaft in more than one direction, while permitting satisfactory engagement of the cutting member with the shear plate during the operation of the dry-shaver.

The establishment of such a movable connection between a driving shaft and a cutting member of a dry-shaver is known from the prior art disclosure, Austrian Pat. No. 197,239; here a thin shaft which is bent several times in a plane has a straight centre portion which is supported for rotation in a slot in the end of the driving shaft.

This prior reference is comparatively complicated and requires the use of several components, with a resulting high cost of manufacture, in comparison with the construction according to the present invention. A further disadvantage of this prior design is difficulty in centering the cutting member relative to the driving shaft, which becomes manifest when component parts have to be replaced.

A permanent and satisfactory centering of the driving shaft relative to the cutting member, even on reassembly after dismantling, has been achieved with the present invention; the coupling pin has two pairs of opposite, lateral, convexly curved surfaces. One pair of these opposite faces form part of the curved surface of a circular cylinder having a diameter which is substantially equal to one side of the rectangular aperture provided in the cutter-carrying holder portion of the cutting member, the convex surfaces of the other pair of opposite lateral faces form part of the curved cylindrical surface of another circular cylinder having a diameter which is substantially equal to the other side of the said rectangular aperture in the cutting member, while in the assembled condition the centers of the driving shaft, of said cylinders, and of the spherical surface on which lie the eight vertices of the rectangular aperture coincide.

An embodiment which provides very satisfactory results in practice, is characterized in that the convexly curved surfaces of only one pair of opposite lateral faces form part of a spherical surface having a diameter which is substantially equal to the longer side of a prismatic or rectangular aperture of the cutting member, and the convex curved surfaces of the other pair of opposite faces form part of the surface of a circular cylinder having a diameter which is substantially equal to the shorter side of the said aperture provided in the cutting member, while the centers of the said spherical surface, of the said cylinder, and of the spherical surface, of the said cylinder, and of the spherical surface on which lie the eight vertices of the rectangular aperture coincide in the assembled condition.

The coincidence of the said centers during each movement and position of the cutting member relative to the driving shaft ensures satisfactory and permanent centering The invention will be further described with reference to the accompanying schematic drawings, which show several advantageous details of one embodiment.

Figure 2:
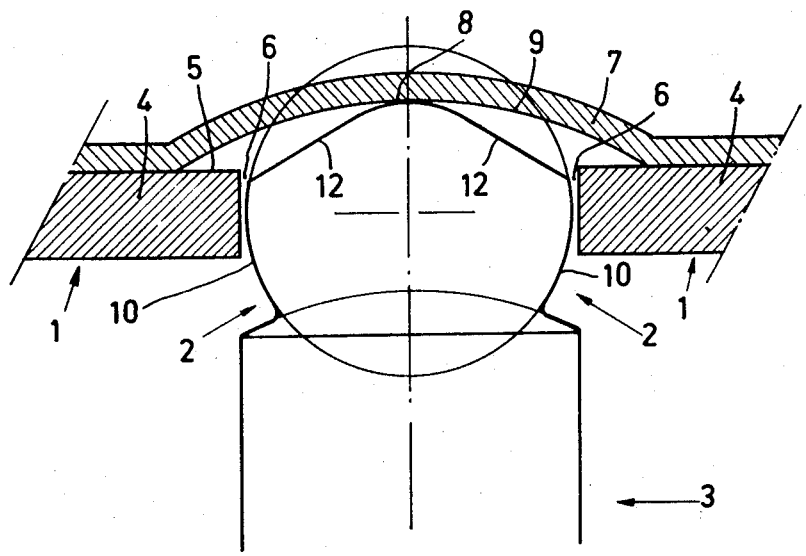
Figure 3:
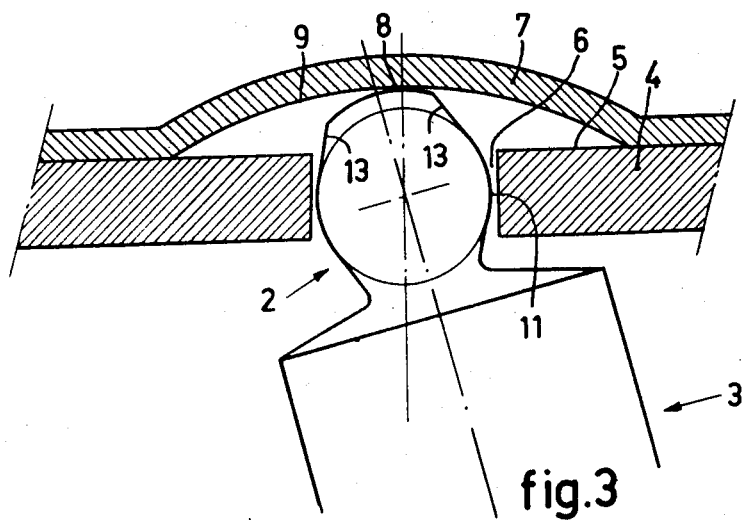
Figure 4:
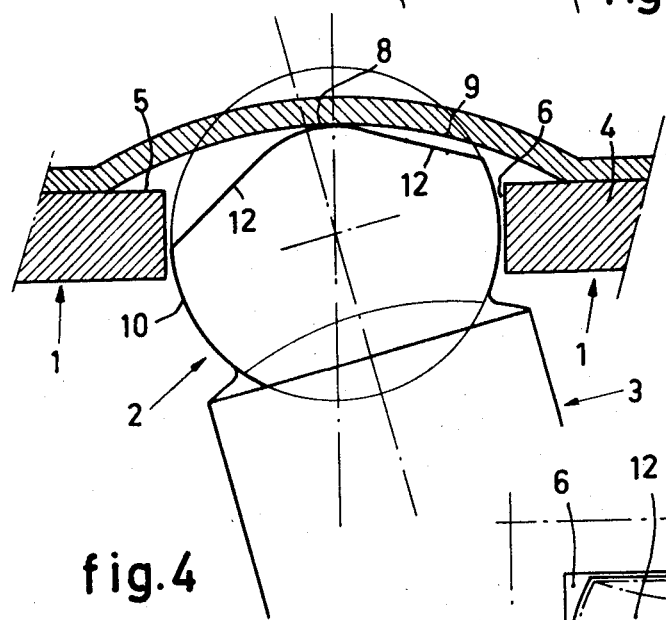
Figure 5:
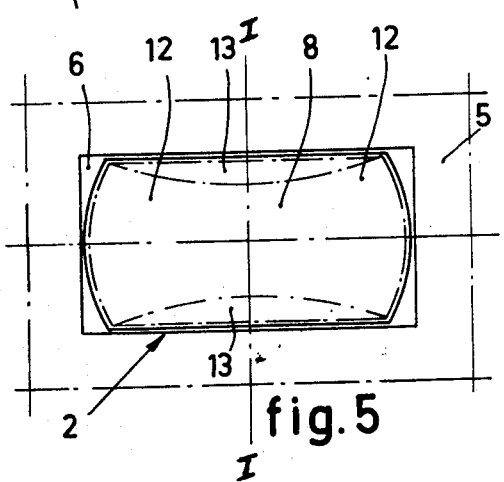

FIG. 1 is a fragmentary elevation view in section of the shaving head and of the driving shaft which has a free end in the form of a coupling pin; the center portion of this view was taken along a cutting plane I—I of FIG. 5 the shorter sides of the rectangular aperture of the cutting member, FIG. 2 is a view similar to FIG. 1, but taken along a cutting plane parallel to the longer sides of the aperture, FIG. 3 is a view similar to that of FIG. 1, however, the driving shaft has a certain angular displacement relative to the cutting member, FIG. 4 is a view similar to that of FIG. 2, however the driving shaft has a certain angular displacement relative to the cutting member, and FIG. 5 is a top plan view of the coupling pin when positioned within said aperture.

Referring now to FIG. 1, a cutting member 1 of a shaving head is connected with a free end of a driving shaft 3, which end is shaped to form a coupling pin 2. FIGS. 3 and 4 show that this connection is movable. The coupling pin, which has lateral faces shaped as convex surfaces, extends into a rectangular, prismatic aperture 6 provided in portion 4 of the cutting member 1 which includes cutters 4a that engage shear plate 4b. A cross-section of the aperture 6 defines a rectangle having a pair of longer sides and a pair of shorter sides in FIG. 5. This aperture 6 is disposed centrally about the cutter-carrying holder portion 4 of the cutting member 1, and the coupling pin 2 is shaped in cross-section, so that its lateral faces barely engage the walls of the aperture, with each two opposite lateral faces forming an associated pair. The curved surfaces of one pair form part of the curved surface of a circular cylinder 11 which has a diameter substantially equal to the shorter side of the aperture 6 (see FIGS. 1 and 3).

The curved surfaces of the other pair of opposite faces form part of a spherical surface of a sphere 10 which has a diameter substantially equal to the longer side of the aperture 6. At their upper portions the curved surfaces of the lateral faces of the coupling pin 2 disposed toward and closer to the shear plate 7 terminate in plane or flat surfaces, the plane partial surfaces 13 of one pair of opposite faces being tangent to the opposite lateral faces of the respective cylindrical surface 11, while the plane or flat partial surfaces 12 of the other pair of opposite lateral faces intersect the opposite lateral faces of the respective spherical surface 10.

The coupling pin 2 is retained in its assembled position by a plate 7 disposed across the aperture 6 of the cutting member 1, the inner surface 9 of the plate 7 engaging the facing surface 8 of the coupling pin 2, both during each movement of the cutting member 1 relative to the driving shaft 3 and during the relative stationary condition of these components. In FIGS. 1 to 4, the plate 7 has remote parts adjacent surface 5 of the holder portion 4 of the cutting member 1, while the free end 8 of the coupling pin 2 engages the center part of the plate. FIGS. 3 and 4 show that the center of the spherical surface 10, the center of the cylindrical curved surface 11, and the center of the projected spherical surface on which lie the eight vertices of the aperture 6 in the holder portion 4 of the cutting member 1, always coincide even in an inclined or angular displacement of the driving shaft 3 relative to the cutting member 1.

From this it will be clear that in this situation also satisfactory centering of the cutting member 1 relative to the driving shaft 3 is maintained.

What is claimed is:

1. For use with a dry shaver including a housing and a drive shaft which is rotatable about an axis and has an extending free end, a shaving head securable to the housing and movable between different inclinations relative to said axis, the shaving head comprising a shear plate with outer and inner surfaces, and a cutting member having a generally rectangular aperture in the center thereof, said free end of the drive shaft engaging said aperture to function as a moving coupling, said free end defining a coupling pin formed as a curved body having (in side view) two curved ends forming arcs of a first circle extending laterally as a circular cylinder and (in end view) two curved sides forming arcs of a second circle extending laterally as a circular cylinder of smaller diameter than the first, the aperture having four walls that intersect forming eight vertices which define between them a central point, the intersection of the axes of said first and second cylinders and this central point being coincident.

2. Apparatus according to claim 1 wherein the diameter of the first cylinder is substantially equal to the length of one side and the aperture and the diameter of the second cylinder is substantially equal to the length of one end of the aperture.

3. Apparatus according to claim 1 wherein the cutter member is adjacent and facing the inner surface of the shear plate, and the cutter member further comprises a retaining plate secured upon the upper surface and covering said aperture, the coupling pin having a tip part that engages said retaining plate.

4. Apparatus according to claim 1 wherein said coupling pin has a top surface that defines two intersecting planes, each of which also intersects one of said end parts of said pin, and two additional plane portions each of which is tangent to one side of the aperture and intersects both of said intersecting planes.

5. A dry-shaver having a driving shaft with a free end and at least one shaving head, which is actuated by said driving shaft, said shaving head comprising a shear plate capable of assuming an inclined position relative to the driving shaft and a cooperating rotatable cutting member held in engagement with the shear plate, said cutting member including a prismatic aperture therein forming a movable connection with said free end of the driving shaft, which end is shaped so as to form a coupling pin, has its sides provided with convexly curved surfaces, which fit bearingly in the prismatic aperture in the cutting member.

6. A dry-shaver as claimed in claim 5, characterized in that the convexly curved surfaces form part of two pairs of opposite faces, which pairs intersect one another substantially at right angles, the convexly curved surfaces of one pair of opposite faces forming part of a cylindrical surface of a circular cylinder having a diameter which is substantially equal to one side of the aperture provided in the cutting member, which aperture has a rectangular cross-section, and the convexly curved surfaces of the other pair of opposite faces forming part of the cylindrical surface of another circular cylinder having a diameter which is substantially equal to the other side of the rectangular aperture in the cutting member while the centers of the said cylinders and of the sphere on which lie the vertices of the rectangular aperture provided in the cutting member coincide in the assembled situation of the driving shaft.

7. A dry-shaver as claimed in claim 5, characterized in that the convexly curved surfaces form part of two pairs of opposite faces, which pairs intersect one another substantially at right angles, the convexly curved surfaces of one pair of opposite faces forming part of a cylindrical surface of a circular cylinder having a diameter which is substantially equal to one side of the aperture of rectangular cross-section provided in the cutting member, and the convexly curved surfaces of the other pair of opposite faces forming part of a cylindrical surface of another circular cylinder having a dimaeter which is substantially equal to the other side of the rectangular aperture in the cutter member, while the centers of the cylinders and of the sphere on which lie the vertices of the rectangular aperture provided in the cutting member coincide in the assembled situation of the driving shaft.

8. A dry-shaver as claimed in claim 5, characterized in that the convexly curved surfaces form part of two pairs of opposite faces, which pairs intersect one another substantially at right angles, the convexly curved surfaces of one pair of opposite faces forming part of the surface of a sphere having a diameter which is substantially equal to the longer side of the prismatic aperture provided in the cutting member, which aperture has a cross-section in the form of a rectangular parallelogram, and the convexly curved surfaces of the other pair of opposite faces forming part of a cylindrical surface of a circular cylinder having a diameter which is substantially equal to the shorter side of the said aperture provided in the cutting member, while the center of the said sphere, the center of the said cylinder and the center of the sphere on which lie the vertices of the rectangular aperture provided in the cutting member coincide in the assembled situation of the driving shaft.

9. A dry-shaver as claimed in claim 5 characterized in that the curved surfaces of the lateral faces of the coupling pin at their upper ends facing the holder portion of the cutting member terminate in plane surfaces.

10. A dry-shaver as claimed in claim 5 further comprising a plate arranged across the prismatic aperture provided in the cutting member, this plate having an inner surface in line contact with the end of the coupling pin facing this inner surface both during any movement of the cutting member relative to the driving shaft and in the stationary relative condition of these component parts, whereby the coupling pin is retained in its assembled position.

* * * * *

UNITED STATES PATENT OFFICE
CERTIFICATE OF CORRECTION

Patent No. 3,748,731          Dated July 31, 1973

Inventor(s) Hendrik Kuiken; Wytse Bergsma

It is certified that error appears in the above-identified patent and that said Letters Patent are hereby corrected as shown below:

On the title page, please insert after section (21) the following:

--(30) Foreign Application Priority Data

July 26, 1968  Netherlands..................6810708--

Signed and sealed this 30th day of July 1974.

(SEAL)
Attest:

McCOY M. GIBSON, JR.
Attesting Officer

C. MARSHALL DANN
Commissioner of Patents